United States Patent
Symons

(10) Patent No.: US 6,461,469 B1
(45) Date of Patent: Oct. 8, 2002

(54) METHOD FOR THE MANUFACTURE OF A FINISHED PRODUCT FROM A LIGNOCELLULOSIC MATERIAL

(75) Inventor: Michael Windsor Symons, Pretoria (ZA)

(73) Assignee: Windsor Technologies Limited, Nassau (BS)

( * ) Notice: Subject to any disclaimer, the term of this patent is extended or adjusted under 35 U.S.C. 154(b) by 0 days.

(21) Appl. No.: 09/937,565

(22) PCT Filed: Aug. 1, 2000

(86) PCT No.: PCT/IB00/01071

§ 371 (c)(1),
(2), (4) Date: Sep. 27, 2001

(87) PCT Pub. No.: WO01/12901

PCT Pub. Date: Feb. 22, 2001

(30) Foreign Application Priority Data

Aug. 18, 1999 (ZA) .............................................. 99/5264

(51) Int. Cl.[7] .......................... B32B 21/02; D21H 17/06; D21H 17/08; D21H 17/35; D21H 17/52
(52) U.S. Cl. .................... 156/296; 156/330; 156/331.4; 156/335; 264/109; 427/393; 427/385.5; 427/391; 427/382
(58) Field of Search ................................ 156/62.2, 296, 156/330, 331.4, 335; 264/109; 427/391, 393, 382, 385.8

(56) References Cited

U.S. PATENT DOCUMENTS

| 3,666,593 A | | 5/1972 | Lee |
| 3,869,432 A | * | 3/1975 | Gaylord ...................... 526/272 |
| 5,280,097 A | | 1/1994 | Hunter et al. |
| 5,385,754 A | | 1/1995 | Earl et al. |
| 5,652,026 A | | 7/1997 | Saka et al. |

FOREIGN PATENT DOCUMENTS

| WO | WO 96/13468 | 5/1996 |
| WO | WO 97/32074 | 9/1997 |
| WO | WO 98/56989 | 12/1998 |

OTHER PUBLICATIONS

Database WPI, Section Ch, Week 199440 Derwent Publications Ltd., London, GB; AN 1994–320286, XP002148605 & JP 06 244513 A ( Mitsubishi Gas Chem Co Inc), Sep. 2, 1994 abstract.

* cited by examiner

*Primary Examiner*—Sam Chuan Yao
(74) *Attorney, Agent, or Firm*—Pillsbury Winthrop LLP

(57) ABSTRACT

A finished product from lignocellulose, such as a length of wood or chipboard, is impregnated with a composition containing a thermosetting resin in a nonaqueous solvent, and a styrene polymer in a nonaqueous solvent. Excess impregnating composition is removed from the impregnated material. The solvent or solvents are also removed. The thermosetting resin may thereafter be subjected to temperature conditions for polymerization to form a finished product.

20 Claims, No Drawings

METHOD FOR THE MANUFACTURE OF A FINISHED PRODUCT FROM A LIGNOCELLULOSIC MATERIAL

This application is the National Phase of International Application PCT/IB00/01071 filed Aug. 1, 2000 which designated the U.S. and that International Application was published under PCT Article 21(2) in English.

BACKGROUND OF THE INVENTION

This invention relates to a method for the manufacture of a finished product from a lignocellulosic material.

Many methods for the manufacture of finished products from various types of lignocellulosic materials are known. For example, PCT/GB 97/00440 to Windsor Technologies Limited teaches a method of preparing a sheet of a lignocellulosic material for the manufacture of a finished product. The sheet is first impregnated with an impregnating composition containing a dicarboxylic anhydride or a tricarboxylic anhydride dissolved in a suitable non-aqueous solvent and an isocyanate thermosetting resin dissolved in a suitable non-aqueous solvent. Thereafter, any excess of the impregnating composition is removed and then the non-aqueous solvent or solvents are removed. Subsequently, the product may be subjected to suitable conditions of temperature and pressure to polymerise and/or cross-link the resin or resins in the sheet of lignocellulosic material to form the finished product.

As another example, PCT/GB 98/01715 teaches a method of manufacturing a finished product from a length of a lignocellulosic material by impregnating the lignocellulosic material with an impregnating composition comprising a solution of a mineral oil, a thermosetting resin, and a non-aqueous solvent. Thereafter, the non-aqueous solvent is removed and the product is subjected to an elevated temperature to polymerise the thermosetting resin to form the finished product.

As a further example, PCT/GB 98/01713 teaches a method of manufacturing a finished product from a lignocellulosic material by impregnating the lignocellulosic material with an impregnating composition comprising a mineral oil and a liquid thermosetting resin, in the form of a dispersion of the liquid resin in the mineral oil and compressing the lignocellulosic material with heating to allow the mineral oil to infuse the lignocellulosic material and to polymerise the thermosetting resin to form the finished product.

While the three methods described above are very effective for the manufacture of finished products from lignocellulosic materials, each method does potentially have disadvantages. For example, the presence of an anhydride, while conferring highly desirable properties on the finished product, can be an irritant on the subsequent machining of the finished product, due to the acidic nature of the dust. Further, while the presence of a mineral oil in a finished product is highly effective in minimising the effects of water ingress, it has the disadvantage of having a tendency to exude from the finished product and to mitigate against its subsequent coating or glueing.

There is thus always the need for improved methods of manufacture of products from lignocellulosic materials.

SUMMARY OF THE INVENTION

According to the invention there is provided a method of manufacturing a finished product from a lignocellulosic material selected from the group consisting of a length of a lignocellulosic material: lignocellulosic particles or fibres; and soft boards; including the steps of:

(1) impregnating the lignocellulosic material with an impregnating composition comprising:
   (i) a thermosetting resin dissolved in a suitable non-aqueous solvent;
   (ii) a styrene polymer dissolved in a suitable non-aqueous solvent;
   (iii) optionally a dicarboxylic anhydride or a tricarboxylic anhydride dissolved in a suitable non-aqueous solvent;
   (iv) optionally a mineral oil or a vegetable oil dissolved in a suitable non-aqueous solvent;
   (v) optionally a catalyst for the thermosetting resin; and
   (vi) optionally a polymethyl hydrogen siloxane hydrophobic agent;

(2) removing from the impregnated lignocellulosic material any excess of the impregnating composition; and (3) removing the non-aqueous solvent or solvents.

The method preferably includes the step of:

(4) subjecting the product of step (3) to suitable conditions of temperature and optionally pressure to polymerise the thermosetting resin to form the finished product.

The length of a lignocellulosic material may be for example a length of solid wood, wood veneer and plywood; a length of a preformed composite board such as chip board, medium density fibre board, high density fibre board, orientated strand board, flake board, and boards made from paper mill sludge, common mixed paper waste and sawdust; and lengths of virgin and recycled paper and cardboard.

Alternatively, the lignocellulosic material may be:

A. lignocellulosic particles or fibres, for examples particles, chips, flakes, strands or fibres of wood or agrifibres, e.g those sourced from annual or bi-annual agricultural crop residues, and paper pulps and the like; and B. soft boards, by which there is meant a board which has not necessarily been impregnated or bound with binder such as a thermosetting resin or the like. Examples are low density boards, i.e boards having a density between 180 and 400 kg/m$^3$ inclusive, formed typically by a wet process.

In general, lignocellulosic material refers to any plant material emanating from the photosynthetic phenomenon.

The thermosetting resin is preferably selected from the group consisting of an isocyanate thermosetting resin, an unsaturated polyester resin, an epoxy resin, and a phenol formaldehyde resole resin.

DESCRIPTION OF EMBODIMENTS

The crux of the invention is a method of manufacturing a finished product from a lignocellulosic material.

The first step is to impregnate the lignocellulosic material with an impregnating composition.

The impregnation may be carried out in a suitable vacuum/pressure/vacuum impregnation apparatus or a pressure cylinder. Alternatively, the impregnation may be carried out by irrigating or preferably spraying a moving web of the lignocellulosic material or by immersing the lignocellulosic material in the impregnating composition to cause the penetration of the impregnating composition throughout the lignocellulosic material. Alternatively, particles of a lignocellulosic material may have applied to them the impregnating composition in a suitable mixer.

The first component of the impregnating composition is a thermosetting resin for the binding of the lignocellulosic material, preferably selected from the group consisting of an isocyanate thermosetting resin, an unsaturated polyester resin, an epoxy resin, and a phenol formaldehyde resole resin, dissolved in a suitable non-aqueous solvent, particularly an aromatic or chlorinated hydrocarbon solvent, or liquid carbon dioxide, or a combination thereof.

The preferred thermosetting resin is an isocyanate thermosetting resin.

Isocyanates are compounds containing the group—N=C=O and are characterised by the general formula:

$$R(NCO)_x$$

wherein x is variable and denotes the number of NCO groups, and R denotes a suitable group.

Examples of organic isocyanates include aromatic isocyanates such as m- and p-phenylenediisocyanate, toluene-2,4- and 2,6diisocyanates, diphenylmethane-4,4 diisocyanate, diphenylmethane-2,4-diisocyanate, and similar isocyanates.

Specific examples of suitable isocyanates are those having an (NCO) content percentage preferably exceeding 20%, more preferably exceeding 25%. These isocyanates promote latency or reduced reactivity because of the high number of NCO groups, and provide the maximum capacity for hydroxyl bonding. Examples are Desmadur VKS or Desmadur VK by Bayer, which are solvent free mixtures of aromatic polyisocyanates such as diphenyl methane-4,4 diisocyanate and polymeric matter. These and similar are among those referred to as MDIs in the industry. A further description used is a diisocyanate-diphenylmethane, further examples being Suprasec DNR-5005, which is a polymeric MDI, or Suprasec 2020 which is a monomeric MDI with available NCO percentages of 30.7% and 29% and which are polymeric MDI with standard functionality and monomeric MDI respectively. The Suprasec resins are supplied by ICI. A further example of a crude MDI is Voronate M 229 by Dow Chemical Company.

Further suitable diisocyanates are the toluene diisocyanates with the alternative names tolylene diisocyanate or toluylene diisocyanate with the abbreviation TDI, such as Desmadur L75 by Bayer.

It is to be noted that the term "isocyanate thermosetting resin" is intended to include the resins per se, i.e polyurethane resins, as well as those components which may be regarded as precursors of the resins, such as MDIs and TDIs.

A further example of the principle of wood esterification is the use of ethyl isocyanate which reacts with hydroxyl groups to form ethyl carbamate (urethane) according to the formula:

$$C_2H_5NCO + H_2O \rightarrow NH_2COOC_2H_5$$

The isocyanate resins are fully soluble in dichloromethane and react with the hydroxyl groups on the cellulose and hemi cellulose molecules of the lignocellulosic material to form a wood ester. In this way they form a chemical bond adhesion rather than a cohesive adhesion. They are therefore effective in contributing not only to a reduction in water sensitivity but also to superior binding.

A further suitable thermosetting resin is an unsaturated polyester resin. An example of a suitable polyester resin is Ultraset 997 by NCS Resins of South Africa, which is a high reactivity orthophthalic unsaturated polyester resin, which is unaccelerated and which is used with a latent catalyst such as a benzoyl peroxide, an example being Triganox 29B50. This resin is suitable for curing in the temperature range of 120° C. to 160° C., at which temperatures curing is typical within 3 minutes with post curing achieved after 30 minutes.

The use of an unsaturated polyester resin, in combination with a styrene polymer, confers upon solid wood dimensional stability, hardness, good machining properties and a patina suitable for the upgrading of marginal wood to make it suitable for interior wood flooring applications and furniture. However, a polyester resin does not impose the internal bond strength and water resistance which can be achieved with the use of an isocyanate resin.

A further suitable thermosetting resin is an epoxy resin such as for example the Epikote series by Shell Chemicals or Araldite PY 340.2 by Ciba-Geigy, with latent heat triggered catalysts in the range of 80° C. such as the boron trifluorides by Anchor Chemicals or aromatic polyamines such as Ancamine SRX.

A further suitable thermosetting resin is a phenol formaldehyde resole resin, for example J2018L by Borden Chemical Corporation, catalysed with Phencat 10.

The thermosetting resin is dissolved in a suitable non-aqueous solvent, preferably an aromatic or chlorinated hydrocarbon solvent. The preferred solvent is dichloromethane, because it is non-flammable, has a boiling point of approximately 39° C. and a high evaporative rate, is relatively inert, is easy to recover, and has a high solvency propagating penetration into the material being treated. The dichloromethane is preferably combined with sub- or more preferably super-critical carbon dioxide.

Another less suitable solvent is acetone.

The impregnating composition preferably comprises from 1% to 30% inclusive, more preferably from 3% to 15% inclusive by mass of the impregnating composition of the thermosetting resin (including the optional catalyst therefor).

As indicated above, the preferred thermosetting resin is an isocyanate thermosetting resin because of its superior reaction with cellulosic components.

The second component of the impregnating composition is a styrene polymer, e.g a styrene homopolymer, copolymer or terpolymer.

Thus, the styrene polymer may be a homopolymer, e.g polystyrene, or a copolymer such as styrene acrylonitrile, or styrene polybutadiene, or a terpolymer such as acrylonitrile polybutadiene styrene, or a blend between them.

The use of a styrene polymer imposes resistance to water uptake and to water ingress on the treated material, minimises dimensional change, particularly shrinkage on drying, improves hardness, and, in the case of wood, imposes a patina and machining properties which contribute to the beauty of the finished product. In addition. styrene polymers have good electric properties and high resistance to chemicals.

The homopolymer polystyrene itself is very hard, which is a property required for soft woods made hard for exposed wood flooring. Polystyrene has a specific gravity of 1.05 to 1.07 and a percentage water absorption after 24 hours of immersion of between 0.04 and 0.06%. The copolymerisation of styrene with another monomer imposes special properties such as toughness.

Again, the styrene polymer may be dissolved in any suitable non-aqueous solvent which may be the same as, or compatible with, the solvent used for the thermosetting resin. Examples of such suitable solvents are set out above.

Styrene is not particularly soluble in liquid carbon dioxide. Thus, it is preferred to dissolve the styrene in dichloromethane, or more preferably a combination of dichloromethane and toluene, and then to add liquid carbon dioxide as the solvent for the thermosetting resin. In this way, the styrene is compatabilised with the liquid carbon dioxide used as the solvent for the thermosetting resin.

The impregnating composition preferably comprises from 1% to 30% inclusive, more preferably from 2% to 15% inclusive, most preferably from 2% to 5% inclusive by mass of the impregnating composition of the styrene polymer.

The impregnating composition may also include certain optional components.

The first optional component is a dicarboxylic anhydride or a tricarboxylic anhydride dissolved in a suitable non-aqueous solvent.

The preferred anhydrides are the dicarboxylic anhydrides, particularly maleic anhydride and succinic anhydride.

The impregnating composition preferably comprises from 0.25% to 4% inclusive, more preferably from 0.5% to 1.5% inclusive by mass of the impregnating composition of the anhydride.

The anhydride serves the function of esterifying to the hydroxyl groups in the cellulosic fractions of the material being treated, mitigating against the swelling of the material on subsequent water wetting.

The solvents for dissolution of the anhydrides are those mentioned above.

The second optional component of the impregnating composition of the invention is a mineral oil or a vegetable oil dissolved in a suitable non-aqueous solvent.

Examples of suitable mineral oils are Quindella 19 or Transcal N by British Petroleum or Waksol F by Sasol Chemical Industries, which is a mineral oil containing a pre-dissolved wax. Examples of vegetable oils are linseed oil, Australian cyprus red oil, tung oil, and tall oil. These oils may be used alone or as a blend with a mineral oil.

The vegetable oils may be used in combination with a catalyst or cross-linking agent for the oil, for example a heavy metal salt, e.g cobalt octoate, zinc octoate, iron octoate or tin octoate.

These catalysts or cross-linking agents for the vegetable oils, also act as cross-linking agents for the further optional component, viz, the polymethyl hydrogen siloxane hydrophobic agent.

The presence of the styrene polymer minimises exudation of the mineral or vegetable oil from the finished product.

The impregnating composition preferably comprises from 2.5% to 30% inclusive, more preferably from 5% to 25% inclusive by mass of the impregnating composition of the mineral oil or vegetable oil.

The third optional component of the impregnating composition is a catalyst for the thermosetting resin, as described above.

The fourth optional component of the impregnating composition is a polymethyl hydrogen siloxane hydrophobic agent, which is preferably used in an amount of from 0.1% to 0.5% inclusive by mass of the impregnating composition. The curing temperature for such siloxanes is in the range of from 120° C. to 175° C. which falls within the range of curing temperatures for the impregnated lignocellulosic material. As indicted above, these siloxanes may be cross-linked by heavy metal salts such as cobalt octoate, optionally added with the vegetable oils.

It is preferred that the total mass of the various components of the impregnating composition of the invention, excluding the solvent, range from 5% to 45% inclusive, more preferably from 6% to 18% inclusive by mass of the impregnating composition.

After impregnation of the lignocellulosic material with the impregnating composition, any excess of the impregnating composition is removed from the impregnated lignocellulosic material.

Thereafter, the non-aqueous solvent or solvents are removed, preferably with recapture, e.g by condensation or by absorption in activated carbon, for reuse. This step may be accelerated by heating in order to increase the vapour pressure of the solvent within the treated material, e.g infra-red, high frequency or microwave heating.

Finally, the impregnated lignocellulosic material is subjected to suitable conditions of temperature and pressure, for a suitable period of time, to polymerise the resins present. For example, the impregnated lignocellulosic material may be treated at a temperature in the range of from 70° C. to 175° C. more preferably in the range of from 90° C. to 140° C. for periods of up to 3 hours. Temperatures in excess of 120° C. also induce the melting of the styrene polymer and further cellular penetration. Particles of a lignocellulosic material coated with the impregnating composition may be subjected to pressures in the range of 10 to 70 kg/cm$^2$ at the temperature ranges given, in order to make board products.

The result of the method of the invention is a finished product with superior properties as described above.

Examples of the invention will now be given.

EXAMPLE 1

Southern yellow pine, poplar and soft maple boards measuring 1" (25 mm)×6" (150 mm)×2.4 m were vacuum/pressure/vacuum impregnated with a composition comprising:

| | |
|---|---|
| Dichloromethane | 72% |
| MDI urethane prepolymer Suprasec 5005 | 8% |
| Polystyrene | 18% |
| Maleic anhydride | 1.5% |
| Wood preservative | 0.5% |
| (all % by mass). | |

After recovery of the solvent the temperature was raised progressively over 60 minutes to 140° C. and the temperature was maintained for a further 60 minutes, to produce the finished product.

EXAMPLE 2

A composite particle board was impregnated by spraying onto a moving web of the board, a composition comprising:

| | |
|---|---|
| Super critical carbon dioxide | 66,25% |
| Toluene | 10% |
| Dichloromethane | 15% |
| MDI urethane prepolymer Suprasec 2447 | 3% |
| Expanded polystyrene waste | 4,5% |
| Maleic anhydride | 0,5% |
| Wood preservative | 0,75% |
| (all % by mass) | |

After removal of the solvent, the temperature was progressively raised over 60 minutes to 140° C. and the temperature was maintained for a further 60 minutes, to produce the finished product.

Lignocellulosic particles may be treated with a similar composition.

What is claimed is:

1. A method of manufacturing a finished product from a lignocellulosic material selected from the group consisting of a length of a lignocellulosic material; lignocellulosic particles or fibres; and softboard; including the steps of:

(1) impregnating the lignocellulosic material with a impregnating composition comprising:
   (i) a thermosetting resin dissolved in a suitable non-aqueous solvent; and
   (ii) a styrene polymer dissolved in a suitable non-aqueous solvent, wherein the styrene polymer is a homopolymer of styrene or a copolymer of styrene with acrylonitrile, butadiene or both acrylonitrile and butadiene, or a mixture of styrene homopolymer and said styrene copolymer;
(2) removing from the impregnated lignocellulosic material any excess of the impregnating composition; and
(3) removing the non-aqueous solvent or solvents.

2. The method according to claim 1, wherein the thermosetting resin is selected from the group consisting of an isocyanate thermosetting resin, an unsaturated polyester, an epoxy resin, and a phenol formaldehyde resole resin.

3. The method according to claim 1 or claim 2, wherein the suitable non-aqueous solvent for the thermosetting resin is selected from the group consisting of an aromatic or chlorinated hydrocarbon solvent and liquid carbon dioxide.

4. The method according to claim 1, wherein the impregnating composition comprises from 1% to 30% inclusive by mass of the impregnating composition of the thermosetting resin.

5. The method according to claim 4, wherein the impregnating composition comprises from 3% to 15% inclusive by mass of the impregnating composition of the thermosetting resin.

6. The method according to claim 1, wherein the suitable non-aqueous solvent for the styrene polymer is an aromatic or chlorinated hydrocarbon solvent.

7. The method according to claim 6, wherein the suitable non-aqueous solvent for the styrene polymer is a mixture of dichloromethane and toluene.

8. The method according to claim 1, wherein the impregnating composition comprises from 1% to 30% inclusive by mass of the impregnating composition of the styrene polymer.

9. The method according to claim 8, wherein the impregnating composition comprises from 2% to 5% inclusive by mass of the impregnating composition of the styrene polymer.

10. The method according to claim 1, wherein the impregnating composition includes:

(iii) a dicarboxylic anhydride or a tricarboxylic anhydride dissolved in a suitable non-aqueous solvent.

11. The method according to claim 10, wherein the impregnating composition comprises from 0.25% to 4% inclusive by mass of the impregnating composition of the anhydride.

12. The method according to claim 1, wherein the impregnating composition includes:

(iv) a mineral oil or a vegetable oil dissolved in a suitable non-aqueous solvent.

13. The method according to claim 12, wherein the impregnating composition comprises from 2.5% to 30% inclusive by mass of the mineral oil or the vegetable oil.

14. The method according to claim 1, wherein the impregnating composition includes:

(v) a catalyst for the thermosetting resin.

15. The method according to claim 1, wherein the impregnating composition includes:

(vi) a polymethyl hydrogen siloxane hydrophobic agent.

16. The method according to claim 15, wherein the impregnating composition comprises from 0.1% to 0.5% inclusive by mass of the impregnating composition of the polymethyl hydrogen siloxane hydrophobic agent.

17. The method according to claim 1, wherein the total mass of the various components of the impregnating composition, excluding the non-aqueous solvent or solvents, comprises from 5% to 45% inclusive by mass of the impregnating composition.

18. The method according to claim 17, wherein the total mass of the various components of the impregnating composition, excluding the non-aqueous solvent or solvents, comprises from 6% to 18% inclusive by mass of the impregnating composition.

19. The method according to claim 1, which includes the step of:

(4) subjecting the product of step (3) to suitable conditions of temperature and optionally pressure to polymerise the thermosetting resin to form the finished product.

20. The method according to claim 19, wherein step (3) is subjected to a temperature of from 70° C. to 175° C. inclusive and a pressure of from 10 kg/cm$^2$ to 70 kg/cm$^2$ to polymerise the thermosetting resin to form the finished product.

* * * * *